United States Patent
Ing et al.

(10) Patent No.: US 7,949,043 B2
(45) Date of Patent: May 24, 2011

(54) METHOD AND APPARATUS FOR BIT RATE CONTROL IN A DIGITAL VIDEO ENVIRONMENT FOR ARBITRARY BANDWIDTH

(75) Inventors: Stephen S. Ing, Beaverton, OR (US); Christopher J. Lord, Portland, OR (US)

(73) Assignee: Heathway Holdings LLC, Wilmington, DE (US)

( * ) Notice: Subject to any disclaimer, the term of this patent is extended or adjusted under 35 U.S.C. 154(b) by 0 days.

(21) Appl. No.: 10/621,102

(22) Filed: Jul. 17, 2003

(65) Prior Publication Data
US 2005/0078193 A1   Apr. 14, 2005

Related U.S. Application Data

(63) Continuation of application No. 09/475,457, filed on Dec. 30, 1999, now Pat. No. 6,633,609, which is a continuation-in-part of application No. 08/773,043, filed on Dec. 24, 1996, now Pat. No. 6,263,020.

(51) Int. Cl.
*H04B 1/66* (2006.01)
(52) U.S. Cl. .................................. 375/240.03
(58) Field of Classification Search ......... 375/240.02, 375/240.05, 240.1, 240.25, 240.26, 240.29, 375/240.15, 240.16, 240.18, 240.03; 348/419.1, 348/411, 222.1; 382/236, 238–239; 386/109, 386/111; 358/426.06; *H04B 1/66*
See application file for complete search history.

(56) References Cited

U.S. PATENT DOCUMENTS

| | | | | |
|---|---|---|---|---|
| 5,010,401 A * | 4/1991 | Murakami et al. | ....... | 375/240.16 |
| 5,038,209 A | 8/1991 | Hang | ............... | 348/410 |
| 5,142,362 A * | 8/1992 | Masera et al. | .......... | 375/240.01 |
| 5,333,012 A * | 7/1994 | Singhal et al. | .......... | 375/240.04 |
| 5,349,383 A * | 9/1994 | Parke et al. | ............... | 375/240.1 |
| 5,384,598 A | 1/1995 | Rodriguez et al. | ............ | 348/384 |
| 5,412,431 A | 5/1995 | Vogel | ............... | 348/405 |
| 5,440,345 A * | 8/1995 | Shimoda | .............. | 375/240.14 |
| 5,442,401 A * | 8/1995 | Murakami et al. | ....... | 375/240.18 |
| 5,459,515 A | 10/1995 | Chevance et al. | ............ | 348/402 |
| 5,489,943 A | 2/1996 | Kutner | .............. | 348/405 |
| 5,565,921 A * | 10/1996 | Sasaki et al. | ............ | 375/240.13 |
| 5,598,213 A * | 1/1997 | Chung et al. | ............ | 375/240.04 |
| 5,631,644 A * | 5/1997 | Katata et al. | ..................... | 341/67 |
| 5,691,770 A | 11/1997 | Keesman et al. | ............ | 348/405 |
| 5,699,119 A * | 12/1997 | Chung et al. | ............ | 375/240.04 |
| 5,710,595 A * | 1/1998 | Hang et al. | ............... | 375/240.05 |

(Continued)

OTHER PUBLICATIONS

*Video CODEC Test Model, TMN5*; ITU Telecommunication Standardization Sector Study Group 15, Working Party 15/1, Expert's Group on Very Low Bitrate Visual Telephony; Source: Telenor Research (TR); Jan. 31, 1995.

(Continued)

*Primary Examiner* — Tung Vo
(74) *Attorney, Agent, or Firm* — Schwabe, Williamson & Wyatt, P.C.

(57) ABSTRACT

According to an embodiment of the present invention, a method is presented for controlling a video image compression system. In this method a video frame of raw video image data is compressed using a processor. Then it is determined whether the processor is limited in its ability to compress video image data. Then, a target frame rate is adjusted based on a current amount of time taken to compress said video frame of raw video image data.

20 Claims, 6 Drawing Sheets

U.S. PATENT DOCUMENTS

| | | | | |
|---|---|---|---|---|
| 5,729,295 A | * | 3/1998 | Okada | 375/240.13 |
| 5,745,178 A | | 4/1998 | Hartung et al. | 348/405 |
| 5,754,233 A | * | 5/1998 | Takashima | 348/390.1 |
| 5,777,680 A | | 7/1998 | Kim | 348/405 |
| 5,790,195 A | * | 8/1998 | Ohsawa | 348/419.1 |
| 5,790,745 A | * | 8/1998 | Sugiyama et al. | 386/111 |
| 5,812,699 A | * | 9/1998 | Zhu et al. | 382/232 |
| 5,889,561 A | | 3/1999 | Kwok et al. | 345/405 |
| 5,969,764 A | | 10/1999 | Sun et al. | 348/404 |
| 6,023,296 A | | 2/2000 | Lee et al. | 348/405 |
| 6,094,455 A | * | 7/2000 | Katta | 375/240.05 |
| 6,115,421 A | * | 9/2000 | Katta et al. | 375/240 |
| 6,188,792 B1 | | 2/2001 | Chujoh et al. | 382/236 |
| 6,259,739 B1 | * | 7/2001 | Kondo | 375/240.23 |
| 6,263,020 B1 | | 7/2001 | Gardos et al. | 375/240.03 |
| 6,426,772 B1 | * | 7/2002 | Yoneyama et al. | 375/240.02 |
| 6,633,609 B1 | * | 10/2003 | Ing et al. | 375/240.03 |
| 6,678,322 B1 | * | 1/2004 | Mihara | 375/240.02 |

OTHER PUBLICATIONS

ITU-T, *Video Coding for Low Bitrate Communication*, Draft H.263, Dec. 5, 1995.
ITU-T, *Video CODEC for Audiovisual Services at p.times 64 kbits*, H.261, Mar. 1993.
Chen et al.: *A self-governing rate buffer control strategy for pseudoconstant bit rate video coding*, IEEE Transaction on Image Processing, vol. 2, Iss. 1, Jan. 1993, pp. 50-59.
Office Action mailed Jul. 21, 1998 for U.S. Appl. No. 08/773,043.
Office Action mailed Mar. 15, 1999, for U.S. Appl. No. 08/773,043.
Office Action mailed Dec. 20, 1999, for U.S. Appl. No. 08/773,043.
Notice of Allowability mailed Feb. 27, 2001, for U.S. Appl. No. 08/773,043.
Office Action mailed Dec. 20, 2001, for U.S. Appl. No. 09/475,457.
Office Action mailed May 8, 2003, for U.S. Appl. No. 09/475,457.
Notice of Allowability mailed Jun. 17, 2003, U.S. Appl. No. 09/475,457.

* cited by examiner

METHOD AND APPARATUS FOR BIT RATE CONTROL IN A DIGITAL VIDEO ENVIRONMENT FOR ARBITRARY BANDWIDTH

RELATED APPLICATIONS

The present application is a continuation of U.S. patent application Ser. No. 09/475,457 filed on Dec. 30, 1999, now U.S. Pat. No. 6,633,609, which is a continuation-in-part of U.S. patent application Ser. No. 08/773,043, now U.S. Pat. No. 6,263,020, filed on Dec. 24, 1996, the disclosures of which are hereby incorporated by reference.

FIELD OF THE INVENTION

The present invention pertains to a method and apparatus for the compression and transmission of video data. More particularly, the present invention pertains to controlling bit rate in a digital video compressor environment coupled to a transmission medium with an arbitrary or varying bandwidth.

BACKGROUND OF THE INVENTION

Figure 1:
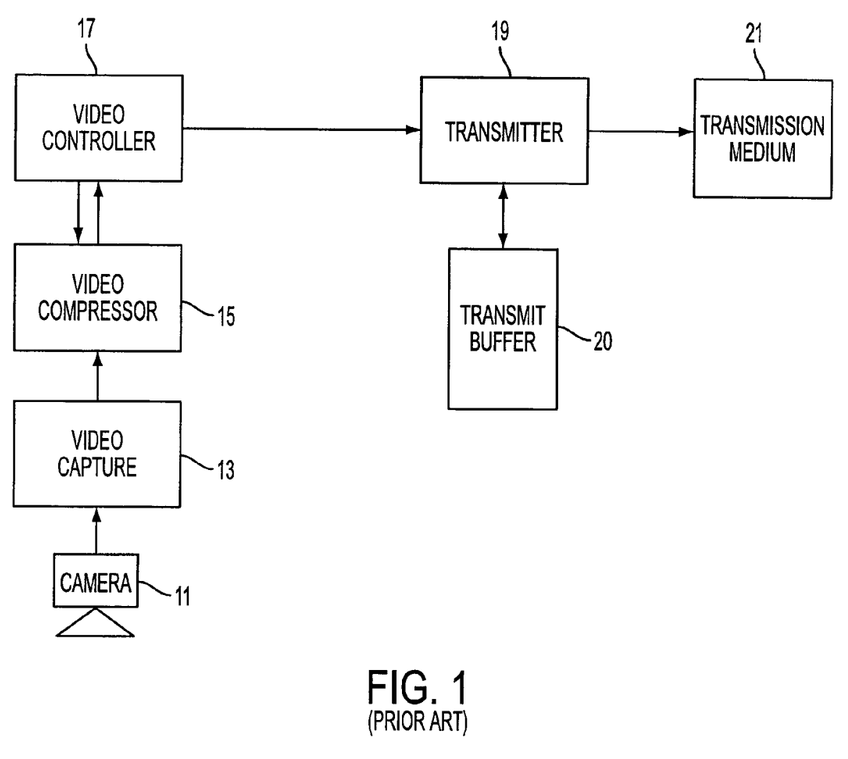
FIG. 1 is a block diagram of video compression and transmission system that is known in the art.

A video compression/transmission system that is known in the art is shown in FIG. 1. A camera 11 is provided that generates video image data for a video capture component 13. The video capture component 13 "captures" the video image data from the camera one frame at a time in a known manner and at a predetermined rate (e.g., approximately 30 frames per second). The video capture component 13 transfers the video frame data to a video compressor 15 which may compress the video image data for the frame according to a bit-rate control algorithm. Such a bit-rate control algorithm typically includes a compression algorithm such as any of a variety of block transform based video transform algorithms such as H.261 (International Telecommunication Union—Telecommunications Standardization Sector (ITU-T), March, 1993), H.263 (ITU-T, Dec. 5, 1995), JPEG ("Joint Photographic Expert Group")(International Organization for Standardization/International Electrotechnical Commission ("ISO/IEC") 10918-1), MPEG-I, and MPEG-II ("Motion Picture Expert Group")(ISO/IEC 11172-2 and 138182). The compressed video frame data is then sent to a transmitter 19 via a video controller 17, and the data is stored temporarily in a transmit buffer 20 under the control of a buffer regulator. The transmitter 19 then pulls data from the transmit buffer sequentially and adds the appropriate protocol information and transmits the data to a transmission medium (e.g., POTS (Plain Old Telephone Service) in a modem-to-modem connection).

In some systems, such as some ProShare® systems and Intel Smart Video Recorder® systems (Intel Corporation, Santa Clara, Calif.), the bit rate control algorithm of compressor 15 operates separately from the transfer of data from the transmit buffer 20 to the transmission medium 21 by the buffer regulator. Because of this separation, the operation of the bit rate control algorithm can only estimate the state of the transmit buffer 20 (i.e., how much data is contained in the transmit buffer 20). Also, the buffer regulator of the transmitter 19 typically requires that the video compressor 15 produce the same amount of compressed data for each frame. This separation of the components leads to inaccuracies in that the transmit buffer 20 is incorrectly filled (i.e., not filled with enough data which reduces the frame rate over the transmission medium or filled with too much data causing delay or latency).

In some systems, the transmission rate can vary widely (e.g., over a high speed connection to a network such as the Internet). For example, in one video-phone application, the bandwidth of the transmission medium may be changed by the user's "on-the-fly" during the communication. With such varying transmission rates, there exists additional problems in processor utilization to adequately compress frames of video data. This is due to the fact that the transmission medium may at times be able to provide more resources than can be adequately or efficiently used by the processor system.

In view of the above, there is a need for a system and method that improves processor utilization in handling transmission of video frame data.

SUMMARY OF THE INVENTION

According to an embodiment of the present invention, a method is presented for controlling a video image compression system. In this method a video frame of raw video image data is compressed using a processor. Then it is determined whether the processor is limited in its ability to compress video image data. Then, a target frame rate is adjusted based on a current amount of time taken to compress said video frame of raw video image data.

DETAILED DESCRIPTION

Figure 2:
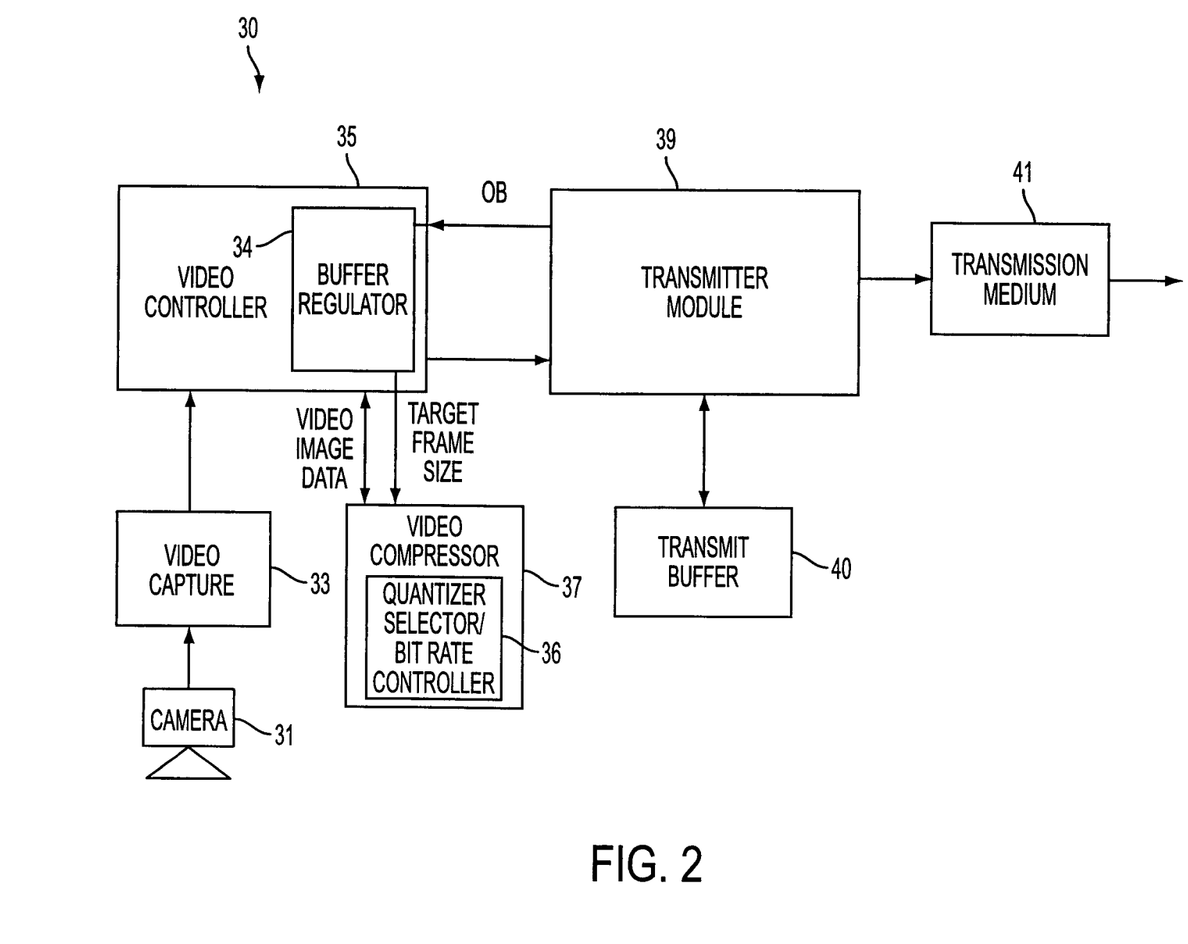
FIG. 2 is a block diagram of a video compression and transmission system operated according to an embodiment of the present invention.

Referring to FIG. 2, a block diagram of an embodiment of a video compression and transmission system 30 of the present invention is shown. In this example, the bit rate controller can include a buffer regulator 34 (in a video controller 35) and a quantizer selector 35 (in a video compressor 37). As in FIG. 1, a camera 31 is provided which supplies video image data to a video capture component 33. The video capture component is capable of supplying video image data at a rate of approximately 30 or 60 frames per second (FPS) to the video controller 35. As is known in the art, the video controller 35 may issue a "callback" (e.g., via the operation of a video capture driver) to the video compressor 37 to notify that component that a video frame is ready to be compressed. The video controller 35, via the buffer regulator 34, schedules the compression of video image data from the video capture component 33 by supplying it to a video compressor 37. The video compressor 37 then compresses the video image data under the control of the quantizer selector 36. The compressed video image data is then supplied by the video controller 35 to a transmitter module 39 which may store this data in a transmit buffer 40. Compressed video data is then pulled from the transmit buffer 40 and sent to a transmission medium 41 such as a Plain Old Telephone Service (POTS). The transmission medium also includes high-speed connections such as high-speed Internet connections such as digital subscriber lines and cable modem connections.

Using POTS, the bandwidth of the phone lines is limited to approximately 25-28 kilobits per second (kbps). Using high speed connections, the bandwidth is increased dramatically to 200 to 300 kbps. Due to limitations in the bandwidth of the POTS transmission medium, video image data is most often transmitted at less than the video capture rate of 30 FPS. With a higher-speed transmission medium, a 30 FPS rate is possible, but may not be achievable due to processor limitations. Accordingly, it is possible that not every frame of video image data generated by the video capture component 33 is compressed by the video compressor 37 (i.e., not every frame of video image data may be scheduled to be compressed by the video controller 35). According to an embodiment of the present invention, the system 30 attempts to operate at a target frame rate (i.e., the number of frames of compressed video image data sent over the transmission medium each second) and a target bit rate (i.e., the number of bits per second that are processed by the system 30). For this example, it is assumed, at least initially, that the target frame rate for the system 30 is 30 FPS (with a high-speed transmission medium). A target frame size is calculated as the expected bandwidth of the transmission medium (which is related to the target bit rate and may be set by the user) divided by the target frame rate. Under the control of the bit rate controller 36, the video compressor 37 will attempt to compress video frame data from the video capture component 33 to the target frame size. The compressed video data is then sent by the video controller 35 to the transmitter module 39 and placed in the transmit buffer 40. The quantity of data contained in the transmit buffer 40 (e.g., measured in bits or bytes) is supplied to the video controller 35 as a value, such as an outstanding byte (OB) value. If, for example, the entire transmission medium is not a direct modem-to-modem connection, it is likely that the transmitter module 39 will not be able to provide an exact value for OB. This can be estimated based on the transmission rate as described in further detail below. The bit rate controller 36 compares the OB value to a threshold value or "Low Water Mark" and schedules another frame of video data from the video capture component 33 to be compressed by the video compressor 37 when OB is less than the threshold value. The Low Water Mark may be first multiplied by a Low Water Mark Adjustment value which may be preset to the value 1. The low water mark value should be high enough so that by the time all of the remaining bits have been drained from the transmit buffer 40, the video compressor 37 will have finished compressing the next frame and is ready to place it in the transmit buffer 40.

If the transmitter module 39 is transmitting compressed video data from the transmit buffer 40 to the transmission medium 41 at the target bit rate, and the video compressor 37 is returning compressed video frames having a target frame size, then the target frame rate will be achieved. However, the transmission bandwidth can vary (e.g., when requested by the user) and the video compressor may be able to generate compressed video frames that contain approximately the target frame size. The video controller 35 may detect that the transmit buffer is being drained at a rate different than originally specified over an extended period of time, then the video compression and transmission system 30 can recalculate a target frame size based on the new transmission bandwidth to maintain the same frame rate (or pick a new frame rate), and can vary the low water mark to minimize latency.

Figure 3:
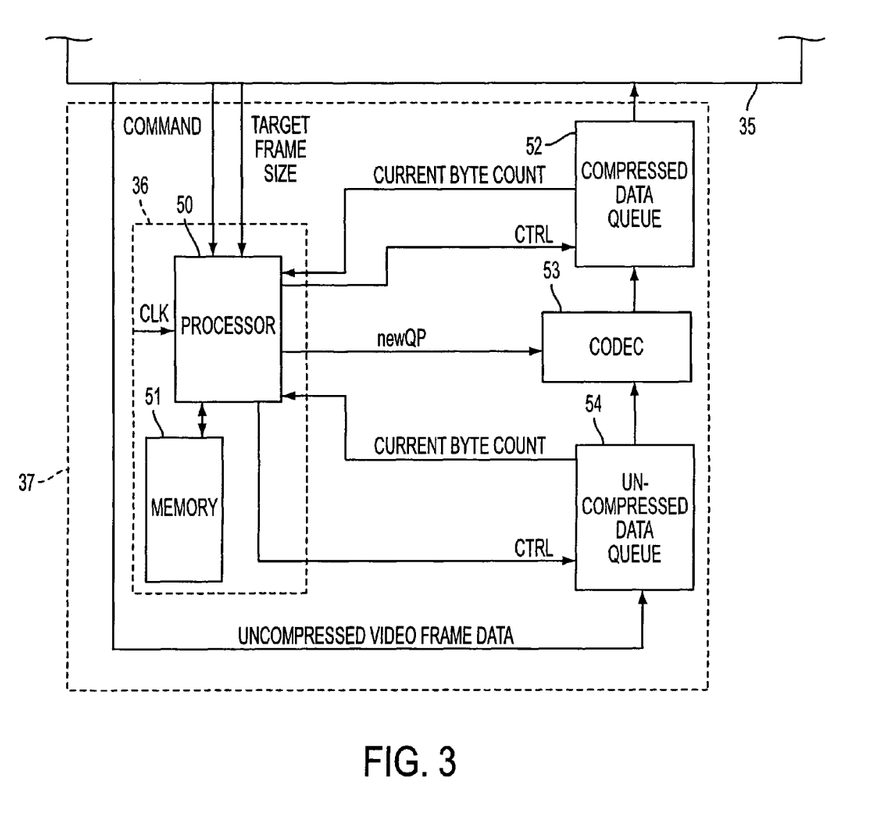
FIG. 3 is block diagram of a video controller and video compressor system operated according to an embodiment of the present invention.

The operation of the video compressor 37 will be described with reference to FIG. 3. When compressing raw video data of a frame, the video controller 35 (via the buffer regulator) calculates the target frame size (i.e., target number of bits per frame) that corresponds to the target frame rate and the expected bandwidth. Calculation of the target frame size will be shown in more detail below. The video compressor 37 includes a coder/decoder (codec) 53 which employs a bit rate control algorithm on a per-frame basis to attempt to achieve the target bit rate. Compression algorithms such as H.263, require that raw video data be divided into a plurality of rows of macroblocks. Each macroblock is of the same size (e.g., in the H.263, each macroblock has a size of 16 by 16 pixels).

The quantizer selector 36 includes a processor 50 that receives the target frame size from the video controller 35 as well as command information (e.g., to schedule a frame compression). When the video controller 35 schedules a frame to be compressed, it is sent to the video compressor 37 and can be stored in an uncompressed data queue 54. The data in queue 54 is sent to the codec 53 which compresses the video frame data under the control of the bit rate controller 50. Part of that control is the providing of a quantization parameter (newQP) to the codec 53.

The Quantization Parameter (QP) value in a hybrid Discrete Cosine Transform (DCT) compression algorithm can vary between a low value of 0 and a high value of 31 according to the H.263 specification. After the DCT is completed, the transformed coefficients are quantized with the QP value. How many bits are needed to transmit the quantized coefficients for a macroblock depends on the value of the QP. When the QP value is small, a large number of bits are usually needed. When the QP value is large, fewer bits are needed. Accordingly, the QP value has an inverse proportional effect on the number of compressed bits generated for each macroblock.

Figure 4:
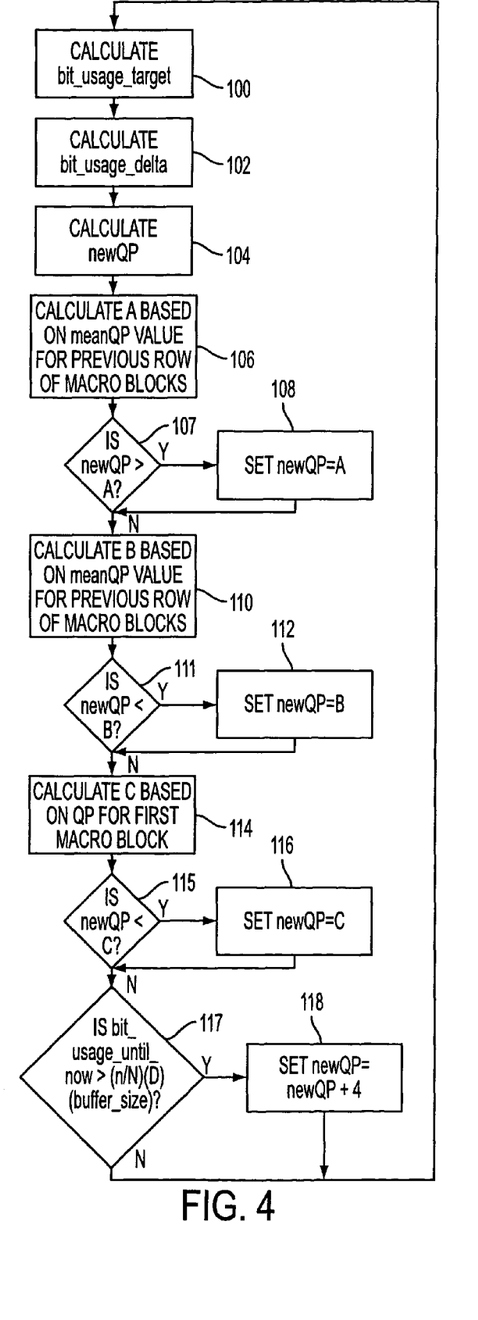
FIG. 4 is a flow diagram of an operation of a quantizer selector.

In this compression algorithm, it is assumed that consecutive frames in a video sequence will have similarities (e.g., similar backgrounds) and will have similar bit usage distributions. A goal of the compression algorithm is to match the bit usage distribution in the current frame with the previous frame. To avoid rapid fluctuations, and to handle scene changes, certain limitations will be applied. It is assumed that there are N macroblocks in a frame. Prior to encoding macroblock n of N, the following calculations are performed to determine the value for QP to be used when encoding the nth macroblock. A flow diagram showing an example of a method for setting the value for newQP is shown in FIG. 4. First, the target frame size is determined as discussed in more detail below. Also, the number of bits that should have been used up in encoding the first n macroblocks is calculated as follows (block 100):

$$\text{bit\_usage\_target} = (\text{prev\_bit\_usage}[n]/\text{prev\_bit\_usage}[N]) * \text{target\_frame\_rate} \qquad \text{Eq. 1}$$

where bit_usage_target is a target value for the number of bits that have already been created for the current compressed frame (i.e., after encoding the first n−1 macroblocks), prev_bit_usage[n] is the cumulative number of bits used in the first n−1 macroblocks of the previous compressed frame, and prev_bit_usage[N] is the total number of bits used in the previous compressed frame. The previous bit usage array can be stored in a memory 51 in the bit rate controller 36.

As suggested in Video Codec Test Model, TMN5 (ITU-T, Study Group 15, Working Party 15/1, Expert's Group on Very Low Bitrate Visual Telephony (Jan. 31, 1995), the disclosure of which is hereby incorporated by reference in its entirety), the value for the first version of the QP value is selected according to Equations 2-5.

$$bit\_usage\_delta = bit\_usage\_until\_now - bit\_usage\_target \quad \text{Eq. 2}$$

(block 102) where bit_usage_until_now is the total number of bits that have been used to compress the current frame up to the current macroblock. This value can be supplied by a compressed data queue 52 coupled to the output of the codec 53.

$$local\_adj = 12.0 * bit\_usage\_delta / (target\_frame\_size * target\_frame\_rate) \quad \text{Eq. 3}$$

$$global\_adj = (prev\_bit\_usage[N] - target\_frame\_size) / (2.0 * target\_frame\_size) \quad \text{Eq. 4}$$

$$newQP = meanQP\_for\_previous\_picture * (1 + global\_adj + local\_adj) + 0.5 \quad \text{Eq. 5}$$

(block 104). The quantization parameter for the nth macroblock has a value between 0 and 31 according to the H.263 specification. The mean value for QP for the previous picture (frame) can also be stored in memory 51 of the bit rate controller 36.

The quantization parameter is changed so as to control the size of the video frame data and the amount the quantization parameter can fluctuate is controlled to prevent degradations in quality. The quantization parameter can be controlled so that it is held between an upper and a lower limit for each row of macroblocks. For example, if the value for newQP, calculated above is greater than a selected term, A (see decision block 107), then newQP is set to A (block 108). Also, if newQP is less than a second selected value, B (see decision block 111), then newQP is set to B (block 112). The value for A can be selected based on the previous value for QP as shown in equations 6-9 (block 106).

$$QP = 1 \rightarrow 2: A = mean\_QP\_for\_previous\_row\_of\_macroblocks + 1 \quad \text{Eq. 6}$$

$$QP = 3 \rightarrow 4: A = mean\_QP\_for\_previous\_row\_of\_macroblocks + 2 \quad \text{Eq. 7}$$

$$QP = 5 \rightarrow 23: A = mean\_QP\_for\_previous\_row\_of\_macroblocks + 3 \quad \text{Eq. 8}$$

$$QP = 24 \rightarrow 31: A = mean\_QP\_for\_previous\_row\_of\_macroblocks + 4 \quad \text{Eq. 9}$$

The value for B can be selected based on equation 10 (block 110):

$$B = mean\_QP\_for\_previous\_row\_of\_macroblocks - 2 \quad \text{Eq. 10}$$

In this example, using equations 6-10, the quantization parameter is prevented from increasing more than four quantization values over one row of macroblocks and is prevented from decreasing more than two quantization values over a row of macroblocks (as compared to the mean quantization parameter value for the previous row of macroblocks). Thus, large fluctuations in the QP value are reduced in the video frame currently being compressed, which would degrade quality. By controlling the quantization parameter in such a manner, the overall system reacts more quickly to changes in complexity in the video sequence and allocates bits more accurately to different parts of the video frame according to a past history of bit allocation. As with other values described above, mean QP values for previous rows of macroblocks can be stored in memory 51 of the bit rate controller 36.

The value for newQP can be set to a selected value C (block 116), if newQP is less than C (decision block 115), where $$C = \tfrac{2}{3} * startQP \quad \text{Eq. 11}$$

(block 114) where startQP is the QP for the first macroblock calculated as:

$$startQP = meanQP\_for\_previous\_picture * (1 + global\_adj) + 0.5 \quad \text{Eq. 12}$$

Limiting the value of newQP so that it never decreases below ⅔ of the average of all quantization parameters for the previous frame prevents an excessively large frame size (e.g., having a number of compressed bytes far in excess of the target frame size) and large fluctuations in the QP value from video frame to video frame which can also degrade quality.

It may be important that the bit count for the frame currently being compressed does not appreciably exceed the target frame size. If it does, then there is a possibility that the transmit buffer 40 (storing buffer_size bits) will overflow resulting in lost video frame data. Accordingly, if bit_usage_until_now > (n/N)*D*buffer_size, then newQP is set to the selected value of E. In this example, E is newQP+4 and D is 0.75.

The target frame size in kbits can be changed to compensate for the ability of the video system to fill the bandwidth of the transmission medium 41. Prior to sending a frame of compressed data to the transmitter module 39 (or after a number of compressed frames are sent), the OB value can be estimated.

Whether the compressor 37 is to compress a video frame from the video capture component 33 can be based on a comparison between the OB value from the transmitter 37 and the threshold value or "low water mark." The low water mark is just high enough so that by the time all remaining bits have been drained from the transmit buffer 40, the video compressor 37 will have finished compressing the next frame and is ready to place it in the transmit buffer 40. If the low water mark is too low, the buffer will be empty for some period of time before the next frame is finished compressing, and thus the bandwidth over the transmission medium 41 will be wasted. On the other hand, if it is too high, then the next frame of video will have sat in the transmit buffer 40 longer than necessary and thus latency would be added to the system 30.

To compute an initial value for the threshold value (Low Water Mark or LWM), two values could be used. The first is the amount of time left before the video compressor 37 would be able to compress a raw video frame from the video capture component 33 if it did not compress the one currently available from the component 33 (i.e., the next send time (NST)). Since the amount of time varies for compressing an image an estimate can be used that is 20% greater than the average of the last y compressions. Accordingly, for a compress time $(CT_i)$ for the ith frame, the current compress time (CCT) at the ith frame would be:

$$CCT_i = (CT_{i-Y+1} + \ldots + CT_{i-1} + CT_i)/y \quad \text{Eq. 13}$$

If VCI is the video capture interval for the video capture component 33 (e.g., 1/29.97 fps or 33.37 ms) the estimate for the next sample time is computed as:

$$NST = VCI + 1.2 * CCT \quad \text{Eq. 14}$$

It can be seen from the above, that the rate at which video frames are captured by the video capture component 33 has an effect on latency in the system 30. Thus, the faster that video frames are captured, the less time the video compressor 37 will be waiting for a raw video frame data from the video capture component 33.

The second value is the current byte rate (CBR) which is the rate at which bytes of compressed data are being read from the transmit buffer 40. The CBR after the ith frame is computed as an average of the last z frames sent as:

$$CBR_i = (L_{i-z+1}/(T_{i-z+1}-T_{i-z}) + \ldots + L_{i-1}/(T_{i-1}-T_{i-2}) + L_i/(T_i-T_{i-1}))/z \quad \text{Eq. 15}$$

where $L_i$ is the length in bytes of the ith compressed frame of video data and $T_i$ is a time stamp (in elapsed milliseconds) associated with frame i. Given these two values, the selection of a value for the low water mark threshold is:

$$LWM = NST*CBR \quad \text{Eq. 16}$$

as system parameters change, such as transmission medium bandwidth and target frame rate, the LWM threshold may be changed to compensate for it. The LWM threshold can be adjusted after each frame (or after a set number of frames) by multiplying it with and LWM adjustment (LWMadj) which would have an initial value of 1.

The buffer regulator 34 can also be used in controlling the generation of so-called PB-frames using the low water mark threshold. As detailed in the H.263 specification, a PB frame includes one P-frame which is predicted from the previously decoded P-frame and one B-frame which is predicted both from the previous decoded P-frame and the P-frame currently being decoded (thus, bidirectionally). If a B-frame is expected at the current compression time, that compression can be scheduled even if the OB value is above the LWM threshold. This is because, even if the B-frame is compressed, it is not sent immediately (i.e., like a P-frame) since the encoder holds on to it and returns it with the appropriate P-frame as a PB-frame.

Figure 5:
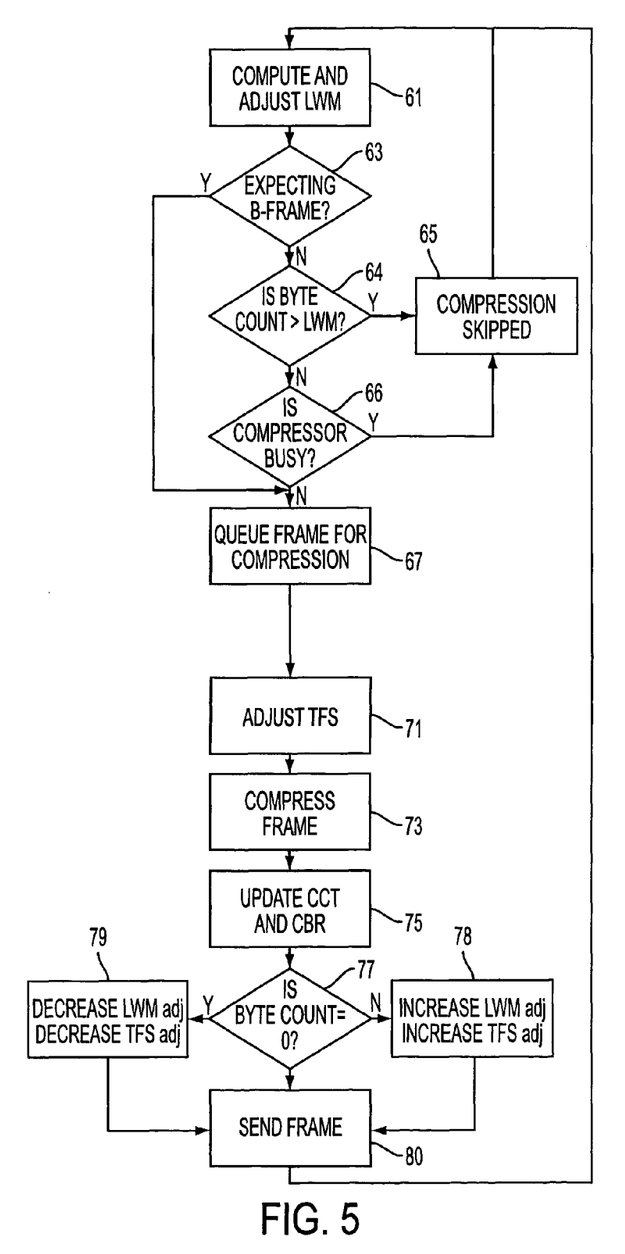
FIG. 5 is a flow diagram of an operation of a buffer regulator.

The operation of the bit rate controller 36 as it relates to the low water mark threshold and the target frame size is shown in FIG. 5 in flow diagram form. In block 61, the low water mark threshold is computed and adjusted as described herein. If a B-frame is expected in decision block 63 control passes to block 67 where the next frame of video data is queued for compression (e.g., in queue 54 of FIG. 3). If a B-frame is not expected, then the OB (Byte Count) value is checked against the low water mark threshold (decision block 63) and the compression is skipped if the OB value is too high (block 65). Otherwise, if the video compressor 37 is not busy (decision block 66), then the video frame data is queued for compression (block 67). In block 71, the target_frame_size variable is adjusted as described herein and the video frame data is compressed by codec 53 (block 73). In block 75 the CCT and CBR value are updated and the OB value is once again checked in decision block 77. If the OB value is 0 then the LWMadj and TFSadj values are decreased (block 79), and if the OB value is not 0, the same variables are increased (block 78). In block 80, the compressed frame data is sent to the transmit buffer 40 via the video controller 35 and control returns to block 61 to handle the next frame of video data.

With the video compression/transmission system described above, an improved quality of video data is achieved in that the system adapts quickly to changing bandwidth at the transmission medium 41. If the transmit buffer is being drained at a rate that is different than originally specified over an extended period of time, then the video controller 35 can recalculate the target frame size based on the new transmission bandwidth to maintain the same frame rate, and can vary the "low water mark" threshold to minimize latency. Though this system works well with a bandwidth that moderately changes (e.g., in a modem-to-modem connection), there are some problems associated with widely varying bandwidths (e.g., as provided in high-speed Internet connections).

Figure 6:
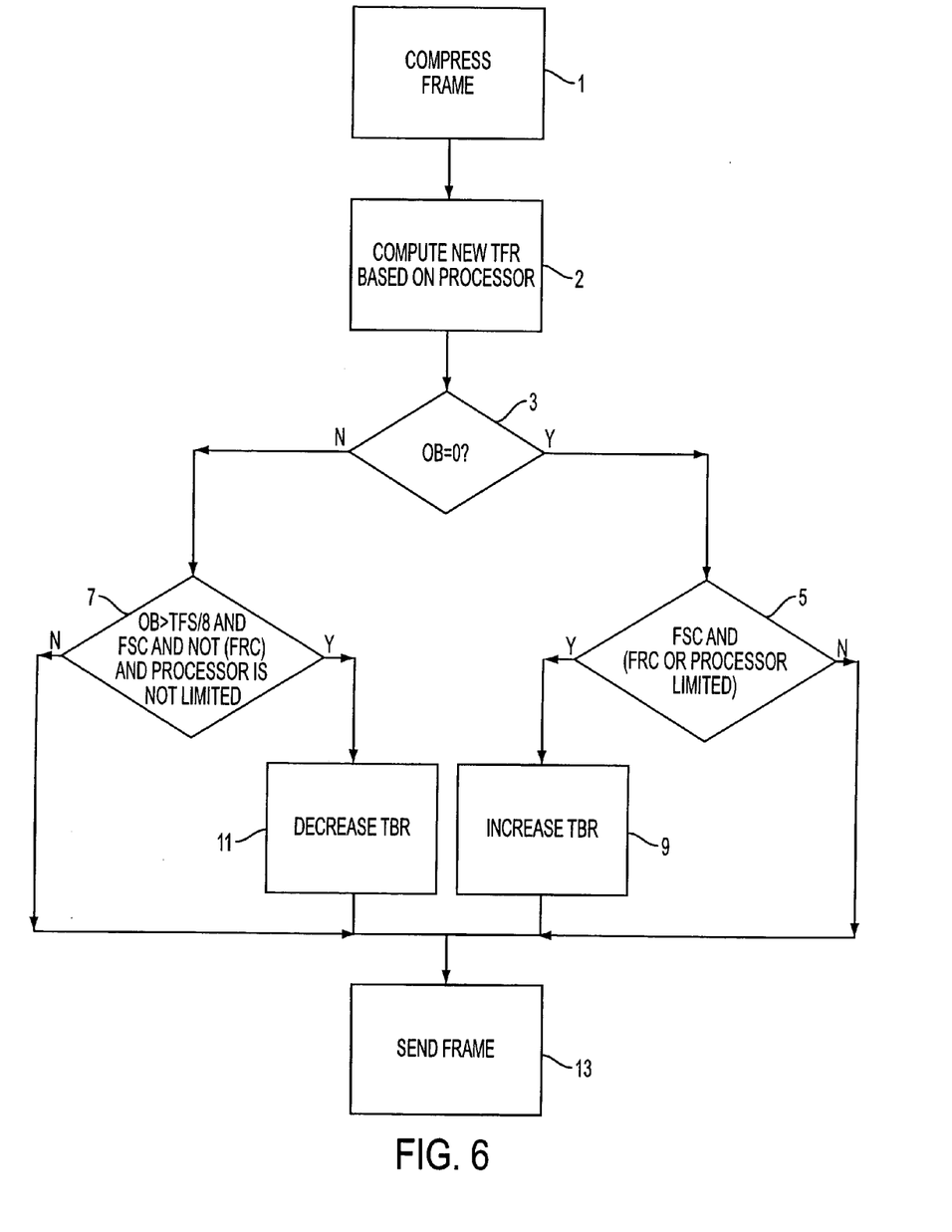
FIG. 6 is a flow diagram of an improved operation of the video compression system according to an embodiment of the present invention.

An embodiment of an improved method for controlling the video compression system of FIG. 2 is shown in FIG. 6. In block 1, a frame is compressed using a video compressor and a block-transform based compression algorithm. In this embodiment of the present invention, when the video capture device has captured a video frame, it alerts the video compressor such as through a "call back" operation, alerting the video compressor to the availability of raw video data for compression. In block 2 a new target frame rate (TFR) is computed based on the processor usage, as described below. In this embodiment, processor usage is determined by comparing the amount of time taken to compress the current video frame ("CurrentCompressTime") to the target frame period ("MaxTimePerFrame"). The target frame period is equal to the inverse of the target frame rate. In this example, the determination is summarized in Eq. 17:

$$ABS(\text{CurrentCompressTime} - \text{MaxTimePerFrame}) > \text{MaxTimePerFrame}/5 \quad \text{Eq. 17}$$

Thus, it is determined if the difference between these two values is greater than 20% of the MaxTimePerFrame. If it is, then it is determined whether CurrentCompressTime is less than MaxTimePerFrame. If the CurrentCompressTime is greater than the MaxTimePerFrame, then it is assumed that the processor is limited in its ability to compress video data (i.e., the processor cannot compress frames fast enough for the current target frame rate). To compensate, the target frame rate is reset based on the CurrentCompressTime.

In this example, the CurrentCompressTime can have a value between 0 and 1000 milliseconds (ms). If the CurrentCompressTime is between 0 and 33 ms then the target rate is set to 33 and the MPI (minimum picture interval) is set to one. This continues in a like fashion for ranges of the CurrentCompressTime (e.g., 33 to 66 ms, 66 to 100 ms, ... 967 to 1000 ms) and can be summarized by Eq. 18:

$$\text{New } MPI = int((30 \times \text{CurrentCompressTime})/1000 + 1) \quad \text{Eq. 18}$$

and the new Target Frame Period is calculated as follows:

$$TFP = (1000 \times \text{New } MPI)/30 \quad \text{Eq. 19}$$

According to an embodiment of the present invention, the whole number value of New MPI is used as a divisor into the frame rate of the video capture device (which is 30 frames per second) to calculate a new Target Frame Rate. As seen in this example, the whole number value for New MPI is in the range 1 to 30. Accordingly, the rate at which frames are presented to the video compressor (i.e., the target frame rate) is reset to 30/(int(New MPI)) according to this embodiment of the present invention. This leads to a smoother video presentation because frames will be taken for compression at more regular intervals than would otherwise be available. For example, if int (New MPI) has the value three, then every third frame from the video capture device would be presented to the video compressor for compression (e.g., through a call back operation by the video capture driver).

Referring back to FIG. 6, after the new Target Frame Rate has been calculated, control passes to decision block 3 where it is determined whether the outstanding byte count (OB) (i.e., the number of bytes to be sent to the transmission module is equal to 0. The OB value is estimated, in this embodiment, as follows. First, a variable DBR is set to the desired byte rate. In this case the desired byte rate is related to the desired transmission rate. The estimate for the OB value is based on the timing of information. For example, t(m) is a timestamp (e.g., date, hours, minutes, seconds or a value from a free flowing counter) for the mth time a call or request is made to obtain the OB value. Every time a frame is sent, the OB value is recalculated as follows:

$$OB = OB + fsize(i) \qquad \text{Eq. 20}$$

where i represents the number of the frame (i.e., the ith frame). Every time a call is made to get the OB value (e.g., during the execution of a routine by the processor), the OB value is then calculated using the following equation:

$$OB = OB - (t(m) - t(m-1))*DBR \qquad \text{Eq. 21}$$

where DBR=the desired bit rate (i.e., the rate at which bits are transferred from the transmitter to the transmission medium). In equation 21, it is seen that the previous value for OB would be the value at time t(m−1). Based on the calculation of OB, if OB is 0 then control passes to decision block 5. In decision block 5, the method seeks to take steps to prevent the OB count value from going to zero. First the LWM value is adjusted by increasing it by a certain percentage (e.g., 1% or 0.01). If desired, this predetermined multiplier value may be stored as "LWM Adjustment" and increased by a certain percentage each time control reaches block 5. Additionally, a maximum value for LWM Adjustment may be set (e.g., 1.5 or 2.0). As stated above, the LWM value affects the scheduling of frames for compression, thus if the LWM is set higher, then requests for a frame to be compressed is made with a higher OB count with the goal that the frame will be compressed before the OB count value goes to 0.

Also as part of block 5, it is determined whether the frame size is close (FSC) to optimal. In this example, the boolean value for FSC will be true (e.g., a binary "1") if Equation 22 is true:

$$abs(AFS - TFS) < TFS/10 \qquad \text{Eq. 22}$$

Thus, in Eq. F, FSC will be true if the absolute value of the difference between the Average Frame Size (AFS) and the Target Frame Size (TFS) is less than 10% of the Target Frame Size. It is also determined if the frame rate is close (FRC) to optimal. In the example, the boolean value for FRC will be true (e.g., binary "1") if Equation 23 is true:

$$AFP < 110\% \text{ of } TFP \qquad \text{Eq. 23}$$

Thus, in Eq. 23, FRC will be true if the Average Frame Period (i.e., the inverse of the Average Frame Rate) is less than 110% of the Target Frame Period (e.g., the inverse of the Target Frame Rate). It is also determined whether the previous callback was skipped because the compressor was busy. This is represented, in this example, by the value NeedBiggerFrames and is defined by the following equation in this example:

$$NeedBiggerFrames = CompressingOnPreviousCB \text{ OR } CompressedPrevCB \qquad \text{Eq. 24}$$

CompressingOnPreviousCB is true if the compressor skipped the previous callback because the compressor was busy (since OB is zero when the frame is sent, meaning that it takes longer to compress a frame than it does to send it). What occurred here was that a frame was scheduled for compression and while the compressor was compressing it, another frame was available for compression but this "previous compression" callback had to be skipped because the compressor was busy. CompressedPrevCB is true if the frame was scheduled for compression for the previous callback. What occured here is that a frame was scheduled for compression and was successfully compressed (since OB is zero when the compressed frame was ready to be transmitted, the target frame size is too small for the video capture interval).

Returning to block 5 the following equation is determined:

$$FSC \text{ AND } (FRC \text{ OR } NeedBiggerFrames) \qquad \text{Eq. 25}$$

If Equation 25 is true then control passes to block 9 where the target bit rate (TBR) is increased (e.g., by 2.5%), if the TFR were not changed in block 2, this would lead to an increase in the target frame size. Otherwise, control passes to block 13 where the compressed frame is sent to the transmission module for sending out over the transmission medium.

If the OB value is not 0 when the frame is ready to send (decision block 3), then control passes to block 7. In block 7 it is first determined whether the OB value exceeds a certain threshold (in this case, 12.5% of the Target Frame Size). If the OB value is less than 12.5% of the Target Frame Size, then there should be no adjustment of the Target Bit Rate so as to avoid what may become excessive corrections of a bit rate that is acceptable under the current operating circumstances. As part of block 7, if the OB value exceeds the threshold, then the LowWaterMarkAdjustment value is decreased by a predetermined value (e.g., 0.001) and then multipled by the LWM value for future scheduling comparisons. Next it is determined whether the target frame rate is being achieved by first determining whether the Current Frame Period is a certain threshold greater the Target Frame Period (TFP). In this example it is determined whether the Current Frame Period is 5% greater than the Target Frame Period. Whether to adjust the Target Frame Size is determined based on whether Eq. 26 is true, namely:

$$(OB > TFS/8) \text{ AND } (CurrentFramePeriod > (1.05 * TFP)) \text{ AND NOT}(FRC) \text{ AND NOT}(NeedBiggerFrames) \qquad \text{Eq. 26}$$

In this embodiment, if all four of these values are true, then the target bit rate is modified in block 11 by decreasing it by a given value (e.g., 2.5%). In either case control passes to block 13 where the compressed frame is sent to the transmission module for sending out over the transmission medium.

Using the method and system of the present invention an improved bit rate control can be achieved, especially at high bit rates. The target frame rate and target bit rate are effectively monitored and updated based on processor usage. This leads to the advantage of modifying the bit rate of the compression system while at the same time achieving a specific frame rate and more uniformly spaced frames giving the impression of smoother, or less choppy, motion in the video output.

Although several embodiments are specifically illustrated and described herein, it will be appreciated that modifications and variations of the present invention are covered by the above teachings and within the purview of the appended claims without departing from the spirit and

What is claimed is:

1. A method, comprising:
acquiring a compression time associated with a time used by a compressor to compress a frame of uncompressed image data under control of a processor that performs a bit rate control of the compressor;
receiving at the processor, separate from uncompressed image data stored in a first data storage queue, a respective current byte count of a current frame of the uncompressed image data stored in the first data storage queue, and receiving separate from compressed image data stored in a second data storage queue, a current byte count of the compressed image data stored in the second data storage queue, to allow the processor to facilitate an adjustment of a target frame rate; and determining by a controller that receives the current frame of uncompressed image data and provides the current frame of uncompressed image data to the first data storage queue, a capability of the processor to compress image data based on whether a difference between the compression time and a target frame period exceeds a threshold, wherein the compression time is based at least in part upon a quantization parameter calculated and selected by the processor based at least in part upon a mean value of a plurality of quantization parameters for a previous frame.

2. The method of claim 1, further comprising adjusting the target frame rate based at least in part on the compression time.

3. The method of claim 2, wherein said target frame rate is adjusted to a value equal to a frame rate of a video capture device divided by an integer divisor.

4. The method of claim 3, wherein the frame rate of the video capture device is 30 frames per second and the integer divisor has a value between 1 and 30.

5. The method of claim 1, wherein the threshold corresponds to a predetermined portion of the target frame period.

6. A system, comprising:
a processor to perform a bit rate control to compress a frame of uncompressed image data;
a controller coupled to said processor to determine a capability of a codec under control of the processor to compress image data based on whether a difference between a compression time for a current frame and a target frame period exceeds a threshold, wherein the compression time is based at least in part upon a quantization parameter calculated and selected by the processor based at least in part upon a mean value of quantization parameters for a previous frame; and
a compressor including the processor and the codec, the compressor further including a first data storage queue and a second data storage queue configured to provide the processor, separate from uncompressed image data stored in the first data storage queue, a respective current byte count of uncompressed image data stored in the first data storage queue, and separate from compressed image data stored in the second data storage queue, a current byte count of the compressed image data stored in the second data storage queue, to allow the processor to facilitate an adjustment of a target frame rate.

7. The system of claim 6, wherein said controller is further configured to adjust said target frame rate based at least in part on the compression time.

8. The system of claim 7, wherein said controller is further configured to adjust said target frame rate to a value equal to a frame rate of a video capture device divided by an integer divisor.

9. The system of claim 8, wherein the frame rate of the video capture device is 30 frames per second and the integer divisor has a value between 1 and 30.

10. The system of claim 6, wherein the threshold corresponds to a predetermined portion of the target frame period.

11. The system of claim 6, wherein the codec is coupled to receive the uncompressed image data from the first data storage queue and coupled to provide the compressed image data to the second data storage queue.

12. The system of claim 11, wherein the processor is configured to control a compression rate of the codec.

13. A system, comprising:
a compressor including a processor, and further including:
a first data storage queue for uncompressed image data; and
a second data storage queue for compressed image data, the first and the second data storage queue to be coupled to a codec to allow the codec to compress the uncompressed image data under control of a bit rate controller including the processor, the processor to be coupled to receive a current byte count of a current frame of the uncompressed image data stored in the first data storage queue and to adjust a compression algorithm used by the codec to compress the uncompressed image data; and
a controller coupled to the processor and configured to determine a capability of the codec to compress the uncompressed image data based on whether a difference between a compression time for a current video frame and a target frame period exceeds a threshold, the determining to be performed to facilitate adjusting a target frame rate based at least in part on the compression time, wherein the compression time is based at least in part upon a quantization parameter calculated and selected by the processor based at least in part upon a mean value of quantization parameters for a previous video frame.

14. The system of claim 13 wherein the processor is configured to provide each of the first and the second data storage queues with a control signal and the second data storage queues is configured to provide the processor with a current byte count of the compressed image data.

15. The system of claim 13, wherein the threshold corresponds to a predetermined portion of a target frame period.

16. The system of claim 13, wherein the compression algorithm is configured to compare a bit usage distribution of a current video frame to a bit usage distribution of a previous video frame.

17. An apparatus, comprising:
a compressor, including:
a processor configured to perform a bit rate control to compress a frame of uncompressed image data; and
a codec coupled to the processor, and configured to compress image data based on whether a difference between a compression time for a current frame and a target frame period exceeds a threshold, wherein the compression time is based at least in part upon a quantization parameter calculated and selected by the processor based at least in part upon a mean value of quantization parameters for a previous frame;
wherein the compressor further includes a first data storage queue and a second data storage queue coupled to provide the processor, separate from uncompressed image data stored in the first data storage queue, a respective current byte count of uncompressed image data stored in the first data storage queue, and separate from compressed image data stored in the second data storage queue, a current byte count of the compressed image data stored in the second data storage queue, to allow the processor to facilitate an adjustment of a target frame rate.

18. The apparatus of claim 17, wherein the quantization parameter is further calculated based at least in part upon a local and a global adjustment parameter.

19. The apparatus of claim 18, wherein the local adjustment parameter is based at least in part upon a difference between a number of bits used to compress the current frame and a target number of bits for compressing the current frame.

20. The apparatus of claim 17, wherein the quantization parameter is configured to fall within an upper and a lower limit for each row of macroblocks in the current frame.

* * * * *

UNITED STATES PATENT AND TRADEMARK OFFICE
CERTIFICATE OF CORRECTION

PATENT NO.         : 7,949,043 B2                                       Page 1 of 1
APPLICATION NO.    : 10/621102
DATED              : May 24, 2011
INVENTOR(S)        : Ing et al.

It is certified that error appears in the above-identified patent and that said Letters Patent is hereby corrected as shown below:

Column 12, line 26, in Claim 14, delete "queues" and insert -- queue --.

Signed and Sealed this
Sixteenth Day of August, 2011

David J. Kappos
*Director of the United States Patent and Trademark Office*